Jan. 27, 1970   W. TILSE   3,491,530
WATCH BALANCE WHEEL
Filed Feb. 17, 1969   2 Sheets-Sheet 1

INVENTOR
Wilhelm Tilse

BY
*Davis, Hoxie, Faithfull & Hapgood*
ATTORNEYS

INVENTOR.
Wilhelm Tilse
BY
Davis, Hoxie, Faithfull & Hapgood
ATTORNEYS

United States Patent Office 3,491,530
Patented Jan. 27, 1970

3,491,530
WATCH BALANCE WHEEL
Wilhelm Tilse, Pforzheim-Birkenfeld, Germany, assignor to The United States Time Corporation, Waterbury, Conn., a corporation of Connecticut
Filed Feb. 17, 1969, Ser. No. 799,749
Int. Cl. G04c 3/04
U.S. Cl. 58—28                                    7 Claims

ABSTRACT OF THE DISCLOSURE

A balance wheel for a watch carries a flat coil wound of fine wire. The balance wheel includes a non-magnetic metal rim having a widened portion and a spoke. A plastic member fixed to the spoke carries the coil between its arms.

Description

The present invention relates to horology and more particularly to the construction of the balance wheel of a watch.

The timekeeping ability of a horological instrument is dependent upon the accuracy of its frequency regulating element, which in the case of a watch is its balance wheel. The balance wheel must satisfy many requirements. As small watches are thought desirable, the balance wheel should be as small as possible consistent with good timekeeping. The balance wheel must be shaped so that it can be poised, i.e., exactly balanced, for example, by removal of metal. The balance wheel should not greatly add to the cost of the watch and should not be influenced by magnetic fields and by changes in temperature.

The problem of constructing a satisfactory balance wheel is particularly acute in electronic or electric watches in which a small electric coil is carried by the balance wheel. In such a watch the coil is used, in effect, as the moving member of a motor and converts the electrical energy from a battery cell into rotary motion to drive the gear train and hands of the watch. The coil interacts with the field, or fields, of one or more permanent magnets, or electromagnets, fixed on a plate of the watch. The interaction of the coil and the magnetic field causes the rotation, i.e., the drive of the balance wheel. A suitable magnetic arrangement and electronic circuit is described in Zemla's U.S. Patent No. 3,046,460. An electric watch generally utilizes a spring which makes contact with a pin on the balance wheel to bring current to the coil. The other contact of the coil is made through the hairspring. An electronic watch may use two hairsprings to conduct current to and from the coil.

It has been found advantageous to utilize only one coil carried by the balance wheel, instead of two or more coils. One coil is less costly to wind than a plurality of coils, and requires fewer magnets. However, the single coil may present a difficult problem in regard to the construction of the balance wheel assembly. If the coil is held by metal arms, eddy currents may be induced in the arms by the magnets. Eddy currents are electric currents induced in metal when it passes through a magnetic field. The current establishes a field opposed to the field of the magnet. Eddy currents act as a drag on the balance wheel and are wasteful of power, which is precious in battery driven watches. The use of a single coil on the balance wheel causes an appreciable amount of mass to be concentrated on the side of the balance wheel carrying the coil. The weight of the balance wheel must be evenly distributed, so that a counter-weight or other means must be used to balance the coil. Such a counter-weight may give rise to eddy currents or to problems of manufacture.

It is the objective of the present invention to provide a balance wheel assembly for an electric or electronic watch, which (1) does not show adverse eddy current effects, (2) may be readily poised, (3) may be mass-produced at relatively low cost, and (4) is non-magnetic.

In accordance with the present invention, a balance wheel assembly for a watch is provided. The balance wheel may be utilized in either a contact electric watch or in an electronic watch, for example, utilizing a solid-state circuit. The balance wheel assembly is constructed with a metal or plastic staff and with a solid metal rim. The metal rim provides desirable mass at the furthest point from the staff. Preferably only a single spoke of metal is used, which reduces undesirable eddy currents and which provides some protection against shocks. A flat coil, wound of fine wire, preferably in a round annular shape when viewed in top plan view, is carried on a plastic carrier member. The plastic member is light in weight, which is desirable near the staff, and does not exhibit eddy current effects. The plastic member may also act, in effect, as a spoke to steady the rim.

Other objectives of the present invention will be apparent from the following detailed description of a preferred embodiment of the invention, taken in conjunction with the accompanying drawings, in which.

Figure 1:
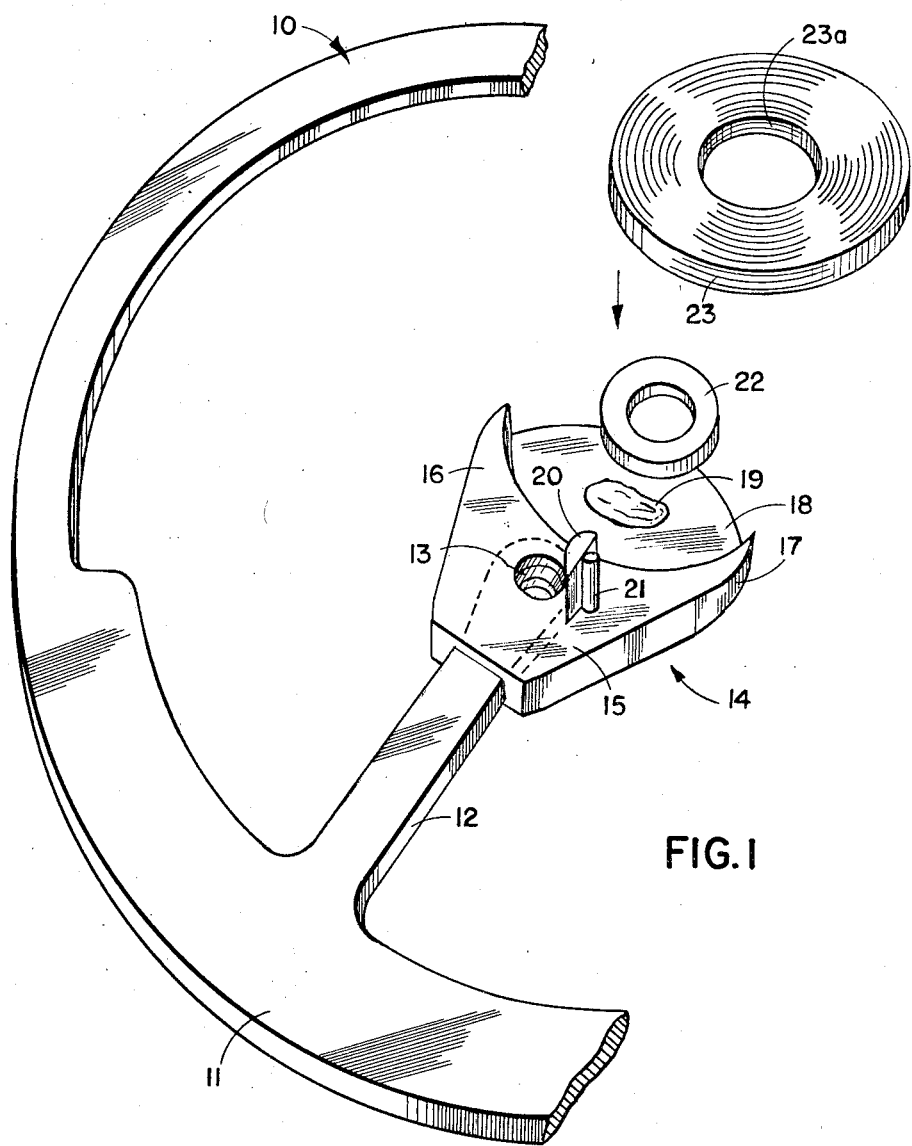
FIG. 1 is a perspective exploded enlarged view of the balance wheel assembly of the first embodiment of the present invention showing the rim partly broken away.

The balance wheel of FIG. 1 includes an annular rim 10 formed of a non-magnetic metal such as brass. A widened portion 11 of the rim, which is integral with it, is provided to counter-balance the coil and poise the balance wheel. It provides an area from which metal may be removed, for example, by forming small drilled cavities, in order to poise the balance wheel. A wheel spoke 12 is preferably integral with the widened portion 11 and directed from it toward the center of the wheel. The spoke 12, near its free end, has a hole 13 adapted for the balance wheel staff. The balance wheel rim 10, with its widened portion 11 and spoke 12, is preferably stamped from a sheet of non-magnetizable metal, such as brass.

A plastic member (carrier) 14, of a plastic resin, is secured on the free end of the spoke 12, for example, by an epoxy adhesive or by injecting the plastic resin about the end of the spoke. The plastic member is preferably molded from a plastic which: (1) may be precisely molded or otherwise formed, (2) is not adversely affected by moisture, (3) is dimensionally stable under temperature changes, (4) may be cast in thin-wall constructions, (5) is not adversely affected by aging, and (6) may be adhered using available adhesives such as epoxy formulations. A suitable plastic resin is "Duroplast," which is formed by both injection molding under press pressure. "Duroplast" is thermosetting plastic such as Bakelite, Buton or epoxy resin (Alfane-Epiphen).

The plastic material is not subject to eddy currents. It permits a desirable reduction in mass near the center of the balance wheel, the ratio of the weight of plastic to brass being about 7 to 1. However, the strength of plastic may be less than the strength of metal, requiring a thicker balance wheel assembly. Such a thicker balance wheel may be accommodated in the watch, for example, by reduction of the thickness of the magnet or by special shaping of the shunt.

The plastic member 14 consists of, as integral members, a body portion 15, a left arm 16, a right arm 17, a web 18 joining the left and right arms, and a ring 22 secured to the web 18. A drop 19 of epoxy resin is placed on web 18 and the coil 23 is pressed on the adhesive. The ring 22 fits within the hole 23a in the coil 23. A non-conductive D-shaped contact jewel 20 is press-fitted in the body portion 15 and a metal contact pin 21 is press-fitted in the body portion 15 next to the contact jewel. The diameter of the hole 23a is held to a close and exact tolerance. Consequently, the plastic ring 22, which may be exactly formed, locates the coil with precision, in regard to the balance wheel assembly. The ring 22 permits the positioning of the coil to be accomplished without the use of a jig.

Figure 2:
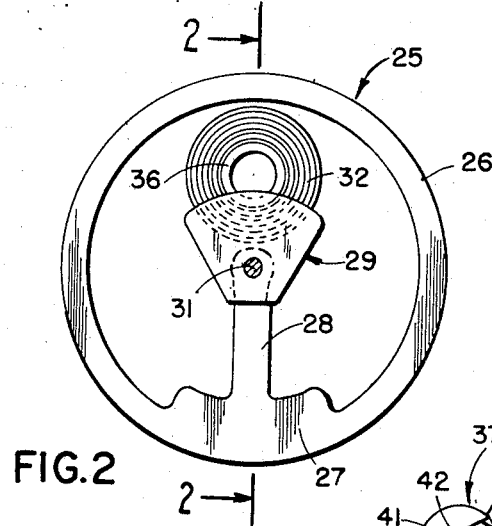
FIG. 2 is a top plan view of the balance wheel of FIG. 1 after assembly.
Figure 3:
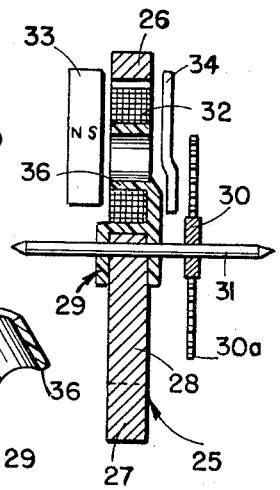
FIG. 3 is a side view taken along line 2—2 of FIG. 2 in the direction of the arrows.
Figure 4:
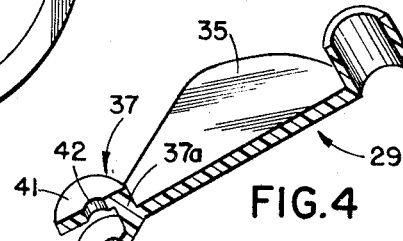
FIG. 4 is a cross-sectioned enlarged perspective view of a portion of the assembly of FIG. 3.

The second embodiment of the present invention is shown in FIGS. 2, 3 and 4. The balance wheel 25 includes a rim 26 of non-magnetic metal, such as brass. The rim has an integral widened portion 27 having an integral spoke 28. A plastic member 29 is secured to the free end of the spoke 28. As in conventional electric watches, a hairspring 30a, at its inner end, is secured to the hub 30 fixed on the balance wheel staff 31. A round annular coil 32, carried by the plastic member 29, is positioned so that it swings between the fixed magnet 33, secured to the frame plate of the watch, and the shunt 34.

The plastic member is shown in detail in FIG. 4. It consists of various integral portions including a body web portion 35 having two ends. A tubular portion 36 is positioned on an end and is adapted to be inserted in the central hole of the coil 32. A holding portion 37 for the spoke 28, at the opposite end of the web, consists of a first disk 39 having a hole 40 for the balance wheel staff 31, a connecting web 37a and a second disk 41 having a hole 42 for the staff 31.

Figure 5:
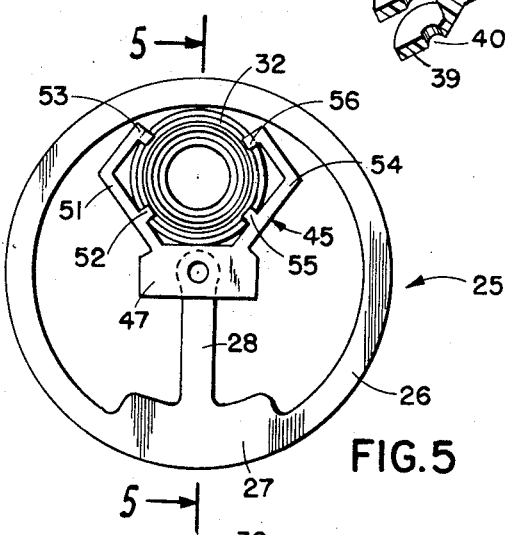
FIG. 5 is a top plan view of the second embodiment of the balance wheel of the present invention.
Figure 7:
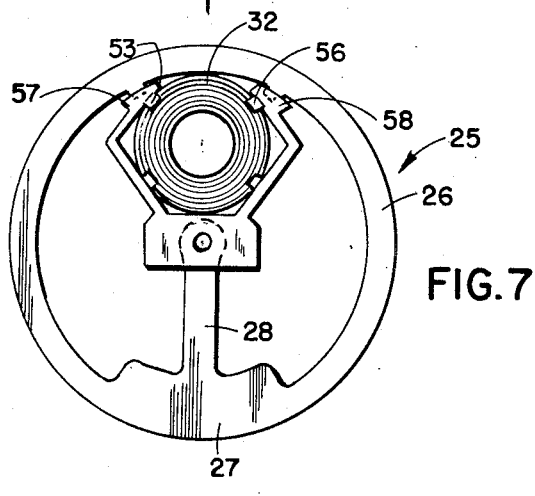
FIG. 7 is a top plan view of a third embodiment of the present invention.

The embodiments of FIGS. 5 and 7 have many parts in common with the embodiment of FIGS. 2-4. They utilize the balance wheel 25, with its rim 26 and integral widened portion 27 and spoke 28 and the coil 32 with its cooperating magnet 33 and shunt 34.

Figure 6:
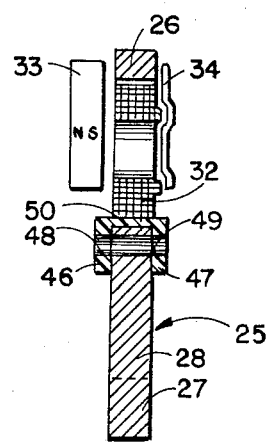
FIG. 6 is a side view taken along line 5—5 of FIG. 5.

The balance wheel assembly of FIGS. 5 and 6 utilizes an integral plastic member 45 having two parallel portions 46 and 47 which encompass and firmly hold the free end of the spoke 28. The parallel portions 46 and 47 have holes, respectively 48 and 49, for the balance wheel staff, and a connecting web portion 50. The plastic member also has a left arm 51 having extending fingers 52 and 53 and a right arm 54 with similar extending fingers 55 and 56. The coil 32 is adhered, for example, by epoxy adhesive, to the extending fingers which may be only on one side of the coil. Alternatively, the fingers may consist of opposite clamping members, that is, each finger would have an opposite finger to clamp the coil between them. The coil is held at its outside diameter. The outer diameter of the coil is less closely controlled as to tolerance than is its inner diameter. Consequently, the plastic arms 51 and 54 are slightly elastic (springy) to encompass coils of slightly different diameters.

In the embodiment shown in FIG. 7, the outer fingers 53 and 56 are extended away from the coil to form rim-holding portions, respectively, 57 and 58. As shown, the rim may be adhered to the portions 57 and 58, which overlay the rim, by an adhesive such as epoxy adhesive, or the rim may be clamped between the extending finger portions 57 and 58.

The contact pin and D-shaped insulating jewel (pin) are not shown in FIGS. 2–7, for the purpose of simplicity of illustration, but would be present in those balance wheel assemblies.

I claim:

1. A balance wheel assembly including a balance wheel staff, a balance wheel of metal consisting of a rim having a widened portion and a spoke fixed to said widened portion and directed toward the said staff, a plastic member fixed to the spoke and having a body portion having a hole through which the staff passes and having two arm portions, and a coil fixed to the plastic member and carried between its arm portions.

2. A balance wheel as in claim 1 wherein the balance wheel is on a non-magnetic metal.

3. A balance wheel as in claim 1 wherein the plastic member has an integral plastic web connecting its arms and an integral plastic ring fixed to the web and wherein the coil has a hole which fits over the exterior surface of said ring.

4. A balance wheel as in claim 3 wherein the coil is fixed to the plastic member by an adhesive positioned on the said web.

5. A balance wheel as in claim 1 wherein the plastic arms have integral extending fingers which are fixed to the outer portion of the coil.

6. A balance wheel as in claim 5 wherein each arm has an additional extending member fixed to the balance wheel rim.

7. A balance wheel as in claim 5 wherein the coil is clamped between clamp members which are formed by the said fingers.

References Cited

UNITED STATES PATENTS

| | | | |
|---|---|---|---|
| 2,936,571 | 5/1960 | Biemiller | 58—107 X |
| 3,058,292 | 10/1962 | Reese | 58—107 X |
| 3,091,914 | 6/1963 | Reese et al. | 58—28 |
| 3,162,996 | 12/1964 | Brethaver | 58—28 |
| 3,359,473 | 12/1967 | Negri | 318—128 |

RICHARD B. WILKINSON, Primary Examiner

S. A. WAL, Assistant Examiner

U.S. Cl. X.R.

58—107